Nov. 17, 1925.  1,562,095
B. W. KADEL
WEAR PLATE FOR CAR TRUCK COLUMNS AND METHOD OF MAKING THE SAME
Filed Sept. 4, 1923
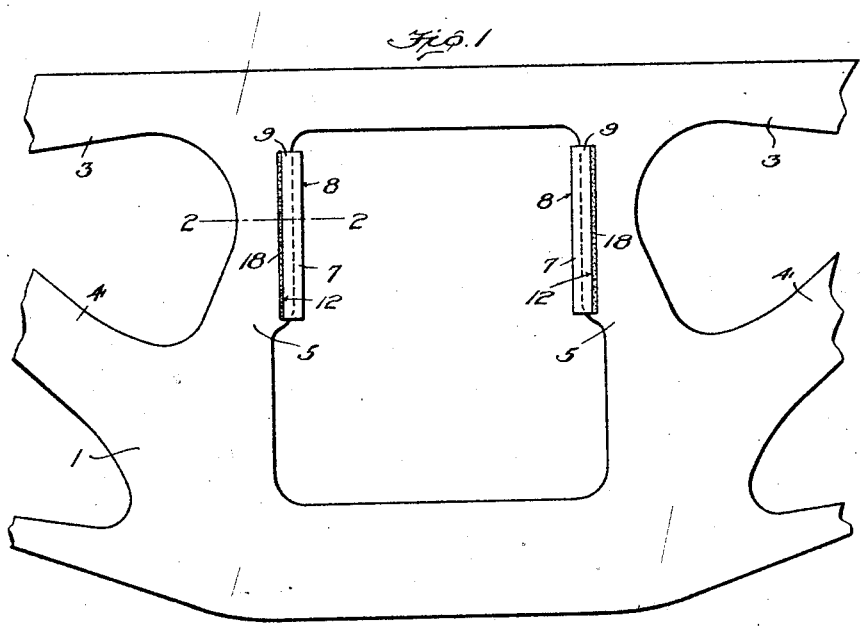
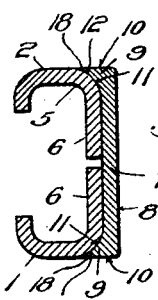
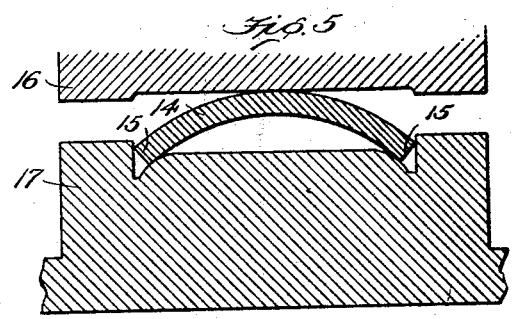
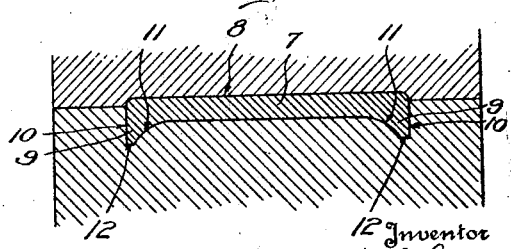
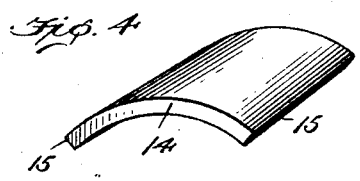
Inventor
Byron W. Kadel
By
his Attorney Patented Nov. 17, 1925.

1,562,095

UNITED STATES PATENT OFFICE.

BYERS W. KADEL, OF BALTIMORE, MARYLAND, ASSIGNOR, BY MESNE ASSIGNMENTS, TO THE SYMINGTON COMPANY, A CORPORATION OF MARYLAND.

WEAR PLATE FOR CAR-TRUCK COLUMNS AND METHOD OF MAKING THE SAME.

Application filed September 4, 1923. Serial No. 660,906.

*To all whom it may concern:*

Be it known that I, BYERS W. KADEL, a citizen of the United States, residing at Baltimore, in the State of Maryland, have invented certain new and useful Improvements in Wear Plates for Car-Truck Columns and Methods of Making the Same; and I do hereby declare the following to be a full, clear, and exact description of the invention, such as will enable others skilled in the art to which it appertains to make and use the same.

The invention relates to wear plates for car truck side frames, and primarily involves a bolster wear plate for the truck columns of side frames and the method of making the same.

In the manufacture of wrought metal side frames from sheet metal blanks each side wall is preferably cut to form top arch bar portions, bottom arch bar portions, and truck column portions. The side walls of the side frame are formed with inturned flanges, and the construction provides a strong stiff and comparatively light weight side frame which is inexpensive both to manufacture and to maintain in service condition. The truck column portions and stiffening flanges bordering the bolster opening are designed to receive bolster wear plates, said wear plates serving to firmly unite the truck column portions of the side walls and prevent their separation or spreading at those points.

It is an object of the present invention to provide a bolster wear plate which will bridge the stiffening flanges of the truck column portions and effectively embrace and unite the spaced side walls of the side frame, said wear plate being formed with flanges adapted to fit the radii of the truck columns, the inner curved faces of the flanged plate and the outer bolster guide faces of said flanges terminating in edge portions designed to provide one side of grooves, the other sides of which are formed by adjacent portions of the side walls, said grooves being utilized in effecting a comparatively rapid and inexpensive welding application of the wear plates to the truck columns. The depth of the bolster guide flanges and the formation of the curved portions engaging the corner bends at the junctions of the truck column portions and stiffening flanges bordering the bolster opening, are so related as to present a welding edge portion for each flange which will be located outside of the wearing face of the flange, said welding edge and adjacent side frame portion forming a welding groove the size of which groove is determined by the relative distance of the edge portion of the flange from the wearing face of the plate contacting the bolster and the thickness of the flange.

The invention also consists in the method of producing said wear plates wherein the otherwise scrap pieces of metal punched from the side walls of the side frame are each cut to form a relatively flat blank the width of which is in excess of the width of the finished wear plate, said blank being then distorted by a bending or bowing operation whereby the side edges, which are to form the flanges of the wear plate, are brought toward each other, thereby reducing the over all width of the bowed blank so as to permit its introduction between die members, and finally flanging said blank by subjecting the same to pressure between the die members, the excess metal provided in the cut blank being caused to move into the flanges and particularly the thickened portions thereof lying between the bolster guide faces and the curved inner faces contracting the radii of the truck columns.

Other features of the invention pertaining to the shape of the wear plate and the formation thereof by my improved method of manufacture will hereinafter appear.

In the drawings chosen to illustrate the invention, the scope whereof is pointed out in the claims,—

Figure 1 is a fragmentary view of a car truck side frame showing bolster wear plates made in accordance with my invention applied thereto.

Figure 2 is a detail horizontal sectional view on the line 2—2 of Fig. 1.

Figure 3 is a perspective view of a sheet metal blank cut from a scrap punched from the side frame blank, said sheet metal blank being cut of a width in excess of the width of the finished wear plate.

Figure 4 is a view of the cut blank after being bent or bowed to an overall width corresponding to the width of the die members between which the wear plate is shaped.

Figure 5 is a detail sectional view of complementary die members illustrating the bowed blank positioned therein preparatory to the pressing operation.

Figure 6 is a sectional view showing the finished wear plate formed between the die members after the pressing operation.

Referring to the drawings, in which similar reference characters designate corresponding parts in the several views my improved wear plate is shown applied to a wrought metal side frame from the metal blank or blanks of which the wear plate is produced. The side frame illustrated includes an outer side wall 1 and an inner side wall 2, said walls being arranged in spaced relation and each having a plurality of top arch bar portions 3, a plurality of bottom arch bar portions 4, and a plurality of truck column portions 5. The side walls are each provided with inturned stiffening flanges arranged to border the several portions of the side frame enumerated, the inturned flanges of the truck column portions which border the bolster opening being indicated by the numeral 6. The radii of the truck columns are designed to afford proper easement of the metal at the junctions of the side wall portions with the inturned stiffening flanges, and it is these radii which my improved wear plate is designed to fit and firmly unite the side frame portions as well as to provide durable wearing surfaces with which the bolster contacts.

The wear plate 7 comprises a web or body portion having a wearing face 8 and side flanges 9 each of which is provided with an outer face 10 forming the wearing surface with which the bolster guide engages, and an inner curved face 11 adapted to fit an adjacent portion of the truck column at the corner bend formed by the juncture of the side wall portion and the inturned stiffening flange 6 bordering the bolster opening. The flanges 9 are formed of a depth sufficient to provide wearing faces adjacent the bolster guide, said flanges also being designed to transversely overlie the stiffening flanges 6 whereby any tendency of the side wall to spread or separate at this point is effectively prevented.

Each flange 9 is provided with an edge portion 12, said edge being formed at the junction of the outer bolster guide wearing face 10, and the inner curved surface 11 fitting the column. The edge is preferably arranged at substantially right angles to the wearing face 10, but it will be understood that the angle may be varied in some cases to form a slightly different shaped welding groove with the adjacent side frame portion. The relative distance which the edge portion 12 is located from the wearing face 8 of the plate may also be varied according to the construction of the truck column upon which the plate is affixed, it being desirable, however, to position the plate upon the column whereby the weld connection along said edge portion will not be subjected to wear by the movement of the bolster. The relative thickness of the edge portion 12 is also capable of variation, it being obvious that a thicker edge portion will provide a correspondingly deeper groove, and vice versa. In applying my wear plate to truck columns having portions offset from the side walls, or otherwise shaped to meet manufacturing and other varying conditions, it will be observed that a particularly effective application can be made by coordinating the inner, outer and edge portions of the flanges, and at the same time produce such coordination in an inexpensive manner by shaping an oversize flat blank of metal according to my improved method now to be described.

The wear plate is made from a scrap piece of metal removed from the blank which is used to form the side frame, said metal piece being cut into a rectangular shape providing the flat blank 13 having a width greater than the finished width of the wear plate. The blank is now subjected to a bending operation in which the body portion of the blank is bowed as indicated by the numeral 14 in Figs. 4 and 5, the edges 15 thereof corresponding to the flanges to be formed on said plate being moved toward each other a distance sufficient to permit the bowed blank, and particularly the edges 15 thereof, to fall within the lines of the drop forging die members 16 and 17. The plate is preferably heated prior to the forging operation which now takes place, the excess metal provided in the blank and contracted abnormally in the bowed portion thereof being forced into the edge portions of the plate to form the relatively thickened portions of the flanges 9, as best shown in Fig. 6. It will be observed that the respective inner and outer faces of said flanges and the edge portion in which said faces terminate are formed by this single forging operation and the wear plate is ready for attachment to the side frame.

The weld connections which firmly attach the wear plates to the truck columns are indicated by the numeral 18, said connections being made along the edge portions 12 of the flanges of the wear plates in a rapid manner, as the welding grooves are formed as soon as the wear plate is positioned upon the truck column. It will also be observed that the welding operation can be immediately begun and concluded in a minimum amount of time, said welds, as the result of the present invention, being of a uniform character and requiring no finishing.

I claim:—

1. A wear plate for car truck side frames comprising a body portion having flanges formed with wearing surfaces, the inner faces of said flanges being curved to fit the radii of the truck columns of the side frame, said inner faces joining the wearing surfaces on said flange in relatively narrow edge portions, said edge portions providing one side of the welding groove used in effecting the attachment of said plate to the truck columns.

2. A wear plate for wrought metal car truck side frames comprising a body portion having flanges formed with wearing surfaces, the inner faces of said flanges being adapted to engage adjacent portions of the truck columns of the side frame, each of said inner faces terminating in an edge portion providing one side of the welding groove used in effecting the attachment of said plate to the truck columns.

3. A wear plate for car truck side frames comprising a body portion having flanges adapted to embrace the opposite side walls of the truck columns of the side frame, each of said flanges having a thickened portion formed between the inner face of the flange adjacent the radius of the truck column and an outer face of the wear plate providing a wearing surface for the bolster guide, and a relatively narrow edge portion adapted to form one side of a groove used in welding the wear plate to the truck column.

4. A wear plate for car truck side frames comprising a body portion provided with flanges, each of said flanges being formed with a relatively wide wearing face adapted to contact the bolster guide, and an inner face curved to engage an adjacent portion of the truck column, said relatively wide wearing face and inner curved face terminating in an edge portion which edge portion, together with an adjacent portion of the truck column, provides a groove adapted to be used in welding the wear plate to the truck column.

5. A wrought metal wear plate suitable for car truck side frames comprising a body portion having forged flanges thereon provided with wearing surfaces, the inner faces of said flanges fitting the curved portions of the truck columns of the side frame, said inner faces joining the wearing surfaces on said flanges at relatively narrow edge portions, which are formed to provide one side of a welding groove suitable for effecting the attachment of the plate to the truck column.

6. A drop forged wear plate for wrought metal car truck side frames comprising a body portion having flanges formed with wearing surfaces, the inner faces of said flanges being formed to fit adjacent portions of the cooperating truck column of the side frame, each of said inner faces terminating in an edge portion suitable for welding said plate to the truck column.

7. In combination with a wrought metal side frame having spaced inner and outer side walls, each of said walls being provided with a bolster opening and having a plurality of top arch bar portions, bottom arch bar portions, and truck column portions with stiffening flanges on said truck column portions bordering the bolster opening, a wrought metal wear plate bridging said flanges and embracing the truck column portions of each side wall, said wear plate having forged flanges fitting the respective truck columns at their juncture with adjacent stiffening flanges and having edges welded to the adjacent side walls.

8. The combination with a wrought metal side frame having spaced inner and outer side walls, each of said walls being provided with a bolster opening and having a plurality of top arch bar portions, bottom arch bar portions, and truck column portions; stiffening flanges on said truck column portions bordering the bolster opening, a wear plate bridging said flanges and embracing the truck column portions of each side wall, said wear plate having a portion adapted to fit the truck columns at their juncture with an adjacent stiffening flange, said portion terminating in an edge which forms one side of a groove used in welding the wear plate to the truck column portions of the side walls.

In testimony whereof I affix my signature.

BYERS W. KADEL.